US006917609B2

(12) United States Patent
Dickey

(10) Patent No.: US 6,917,609 B2
(45) Date of Patent: Jul. 12, 2005

(54) METHOD AND APPARATUS FOR CDMA PN SCANNING AT INDOOR AND OTHER OBSTRUCTED LOCATIONS

(75) Inventor: Sergey L. Dickey, Fairfax, VA (US)

(73) Assignee: PCTEL Maryland, Inc., Chicago, IL (US)

(*) Notice: Subject to any disclaimer, the term of this patent is extended or adjusted under 35 U.S.C. 154(b) by 855 days.

(21) Appl. No.: 09/781,002

(22) Filed: Feb. 9, 2001

(65) Prior Publication Data

US 2002/0110151 A1 Aug. 15, 2002

Related U.S. Application Data

(60) Provisional application No. 60/226,287, filed on Aug. 21, 2000.

(51) Int. Cl.[7] ................................................ H04J 3/06
(52) U.S. Cl. .................................... 370/350; 370/342
(58) Field of Search ........................... 370/303, 342, 370/335, 134.2, 350, 324, 315, 441, 241–253, 503; 455/3.05, 425, 67.1, 255, 424, 473, 67.11, 115.3, 161.3, 226.1–226.2, 67.13, 456.1–456.5, 161; 342/357.06, 357.1, 427, 4, 357.4; 379/1.01–1.04

(56) References Cited

U.S. PATENT DOCUMENTS

| | | | | |
|---|---|---|---|---|
| 4,414,676 A | * | 11/1983 | Kraul et al. ................. 375/368 |
| 5,257,404 A | * | 10/1993 | Goreham et al. ............ 455/503 |
| 5,261,118 A | * | 11/1993 | Vanderspool et al. ....... 455/503 |
| 5,398,276 A | | 3/1995 | Lemke et al. ................. 379/21 |
| 5,515,396 A | * | 5/1996 | Dalekotzin ................... 375/142 |
| 5,590,177 A | | 12/1996 | Vilmur et al. ................. 379/60 |
| 5,604,765 A | * | 2/1997 | Bruno et al. ................. 375/141 |
| 5,752,164 A | * | 5/1998 | Jones ........................... 455/454 |
| 5,768,689 A | * | 6/1998 | Borg ......................... 455/67.14 |
| 5,815,114 A | * | 9/1998 | Speasl et al. ............ 342/357.06 |
| 5,945,948 A | | 8/1999 | Buford et al. ................ 342/457 |
| 5,952,958 A | * | 9/1999 | Speasl et al. ........... 342/357.06 |
| 5,982,322 A | * | 11/1999 | Bickley et al. .......... 342/357.08 |
| 6,058,136 A | | 5/2000 | Ganesh ........................ 375/200 |
| 6,097,972 A | * | 8/2000 | Saints et al. ................. 455/572 |
| 6,101,176 A | | 8/2000 | Honkasalo et al. .......... 370/335 |
| 6,201,802 B1 | * | 3/2001 | Dean ............................ 370/350 |
| 6,222,483 B1 | * | 4/2001 | Twitchell et al. ........ 342/357.09 |
| 6,236,359 B1 | * | 5/2001 | Watters et al. ............. 342/357.1 |
| 6,289,009 B1 | * | 9/2001 | Sato ............................. 370/342 |
| 6,295,023 B1 | * | 9/2001 | Bloebaum .............. 342/357.06 |
| 6,351,236 B1 | * | 2/2002 | Hasler ..................... 342/357.09 |
| 6,418,131 B1 | * | 7/2002 | Snelling et al. .............. 370/337 |
| 6,430,415 B1 | * | 8/2002 | Agashe et al. ............. 455/456.5 |
| 6,433,734 B1 | * | 8/2002 | Krasner ................... 342/357.09 |
| 6,483,825 B2 | * | 11/2002 | Seta ............................. 370/335 |
| 6,542,754 B1 | * | 4/2003 | Sayers et al. ................ 455/502 |

(Continued)

Primary Examiner—Bob Phunkulh
Assistant Examiner—Ian N. Moore
(74) Attorney, Agent, or Firm—Robert Abokhair & Mardula, LLC

(57) ABSTRACT

A test scanner located where it does not directly receive GPS signals relies on a second device, a reference transmitter with a GPS receiver, to provide time information. The reference transmitter has an internal GPS synchronized clock and a pilot transmission pattern that serves as a marker. The reference transmitter is positioned within close proximity to the test scanner. The reference transmitter periodically receives GPS signals and sets its reference internal clock accordingly. This reference transmitter transmits its highly recognizable signal with time synchronization information. The test scanner, able to distinguish between the reference pilot and base station pilot signals, receives the marked signal and uses the timing information to set the test scanner's internal clock. The test scanner can then perform a pilot scan of one or more CDMA base station pilot channels. Measurement and evaluation of signal propagation coverage and adequacy can thus be made from an interior or otherwise GPS obstructed location.

22 Claims, 2 Drawing Sheets

U.S. PATENT DOCUMENTS 6,546,040 B1 * 4/2003 Eschenbach ................ 375/140
6,590,525 B2 * 7/2003 Yule et al. ............. 342/357.06
6,633,590 B1 * 10/2003 Garofalo et al. ............ 370/507
6,690,322 B2 * 2/2004 Shamoto et al. ......... 342/357.1
6,763,241 B2 * 7/2004 Gous et al. .................. 455/502
6,768,450 B1 * 7/2004 Walters et al. ......... 342/357.09
6,826,156 B1 * 11/2004 Sutton et al. ................ 370/249

* cited by examiner

METHOD AND APPARATUS FOR CDMA PN SCANNING AT INDOOR AND OTHER OBSTRUCTED LOCATIONS

RELATIONSHIP TO OTHER INVENTIONS

This application claims priority from Ser. No. 60/226,287, filed Aug. 21, 2000, and entitled "Method and Apparatus for CDMA PN Scanning at Indoor and Other Obstructed Locations."

FIELD OF INVENTION

The present invention relates to radio communication systems including CDMA cellular and PCS telephone networks, and in particular, to a method and apparatus for pn scanning at indoor and other obstructed locations.

BACKGROUND OF THE INVENTION

CDMA cellular and PCS telephone networks are a type of mobile communication network that use psuedo-noise digital codes ("pn-codes"). Pn-codes spread the transmitting signals' spectrum so that multiple communications can occur over the same channel. This is achieved by multiplexing and demultiplexing a particular communication signal within the common channel. This process allows many communications to occur simultaneously. A plurality of base stations use the same pn-codes with each base station assigned a different initial phase of code sequences.

The synchronization of multiple base stations is achieved by the use of the Global Positioning System (GPS) receivers at each base station location. Aided by appropriate stable clock generators, these receivers supply accurate timing information to the base station. Thus, it is important to measure the phase offset of each base station during initial installation and routine maintenance in order to ensure the integrity of the network. Testing devices, for example, pn-scanning receivers, used for this purpose must have a means to synchronize their timing to the absolute time used. An accurate, universally available timing information source, for example the GPS, is required.

These testing devices also assess the adequacy of signal coverage within a service area for cellular and PCS network as well as measure the quality of the CDMA signals from a base station. One measurement device is the pilot scan. The pilot test scanner requires access to an external, accurate clock. The Global Positioning System, GPS, is used as the clock source in the typical pn scan device. As such, these test devices have GPS receivers.

One of the methods used for the synchronization of the test receivers for CDMA pn-scanning requires a GPS receiver as part of the test instrument. Wherever the GPS signals are available, that is in most outdoor settings, this method provides an accurate and convenient way of synchronization. However, it is not practical for settings where there is no reliable GPS coverage, such as indoor settings, some urban locations and wherever access to GPS is obstructed.

Another possible approach relies on the information contained in the CDMA signal itself to derive the accurate frequency and timing information. Berkeley Varitronics Systems sells The Hummingbird™ a handheld PN scanner suited for indoor microcell IS-95 analysis. The Hummingbird demodulates the synchronization channel and reports base station ID, time and date all without use of the GPS. However, this approach suffers from an inherent flaw, since it relies on the accuracy of the base station's signal for the testing of the same signal. Additional problems associated with this approach are the uncertainty caused by an unknown propagation delay from the base station and the complexity of the implementation.

U.S. Pat. No. 6,101,176 was issued to Honkasalo et al. for a "Method and apparatus for Operating an Indoor CDMA Telecommunication system" addresses the issue of indoor and outdoor CDMA competing with each other. Honkasalo proposes that the indoor system monitor the outdoor system to identify those radio resources not in use or interference free so that the indoor system can utilize those resources.

U.S. Pat. No. 6,058,136 was issued to Ganesh et al. for a "System and method for PN offset index planning in a digital CDMA cellular network." This invention describes a system and method for establishing PN offsets so as to minimize interference. One of the parameters chosen is designed to optimize the pn scan rate.

U.S. Pat. No. 5,945,948 issued to Buford et al. for "Method and apparatus for location finding in a communication system" is concerned about being able to locate a subscriber by measuring the user's cell phone transmission signal's angle of arrival and time arrival at one or more CDMA base stations. From this information the user's location can be approximated. Since a more accurate determination can be made with multiple measurements of the subscriber's transmission signal, one embodiment of this patent is to augment base stations with PN scanners so as to increase the coverage for purposes of locating subscribers. These scanners would be equipped with GPS receivers so as to synchronize the scanners' clocks. Part of the analysis requires calculating the time it took the signal to traverse from transmitter to receiver.

U.S. Pat. No. 5,398,276 was issued to Lemke et al. for "Cellular-system signal-strength analyzer". Lemke was concerned about measuring signal strength of radio frequency cellular telephone transmissions in locations frequented by pedestrians including indoors locations and charting the signal strength at different geographical positions. Geographic positioning is calculated using a laser range finder along with a portable computer. Standard AMPS scanner, carried in a backpack is used to measure RF signal strength. AMPS (Advanced Mobile Phone Service) is concerned with analog, frequency division multiple access cellular systems and as such would not be concerned with time synchronization.

U.S. Pat. No. 5,590,177 issued to Vilmur et al. for "Method for preventing a dropped call during a handoff in a radiotelephone system" addresses the problem of dropped calls when one base station hands off a cellular call to a new CDMA base station. The new CDMA base station signal strength to power ratio is measured at the receiver location. As the ratio diminishes to some threshold level, a signal would be sent to the original CDMA cell location indicating that an alternate base station is required to maintain the call. A PN scanner is used to measure the signal to power ratio at the receive location.

Testing CDMA signal propagation and coverage using a PN scanner is well known. However, when the test location does not have ready access to a stable, accurate timing synchronization source, the test results may be suspect.

What is required is a method and apparatus to provide a simple method and apparatus for testing CDMA signal propagation and coverage, including pn offset measurements, in indoor and similar settings with no or limited access to GPS signals.

SUMMARY OF THE INVENTION

It is the objective of the present invention to provide a simple method and apparatus for testing CDMA signal propagation and coverage in indoor and similar settings with no or limited access to a global time synchronization signal such as provided by the GPS.

It is a further object of the present invention to provide a CDMA signal tester devoid of a GPS receiver.

It is yet a further objective of the present invention to provide a simple method and apparatus for testing CDMA signal propagation and coverage in indoor and similar settings with no or limited access to a global time synchronization signal such as the GPS.

The present invention is designed to test base stations' signal adequacy by using two devices, a test scanner and a reference transmitter. The test scanner scans pilot channel signals from base stations and from the reference transmitter. The reference transmitter, a low powered CDMA transmitter that transmits pilot channel signals, is also equipped with an internal clock and a GPS receiver for purposes of setting its internal clock. The reference transmitter uses a uniquely marked pilot signal, that is, the pn sequence information contained in the pilot channel signal is readily identifiable. The reference transmitter pilot signal will also include time of transmission. An embodiment of the present invention uses multiple pilot channel transmissions from the reference transmitter. This reinforces the ability to identify the reference transmitter's pilot signals.

The reference transmitter is positioned to have access to a GPS signal and to be close to the test scanner so that the time delay between transmission and reception by the test scanner is imperceptible. This is achieved, according to one embodiment, by placing the reference transmitter within 240 meters of the test scanner. This distance represents one chip in corresponding pn offset units. Here, a chip is a cycle per second. The CDMA spread spectrum frequency is approximately 1.25 M cycles per second. Radio waves travel at approximately $3\times10^8$ meters per second. Therefore, a signal transmission will travel about 240 meters in 1/1.25 M seconds.

The test scanner comprises a pn pilot scanner additionally equipped with an internal clock. When a pilot signal is received, the test scanner is able to distinguish between a base station pilot and the reference transmitter pilot by the pn sequence information. A pn sequence that is uniquely marked, that is, it does not resemble pseudorandom noise, is known to be from the reference transmitter. Since the reference transmitter is close by, its time of transmission is very close to the GPS time. The test scanner can set its internal clock with this information. The test scanner is then be able to test each base station's pilot channel adequacy without direct access to a GPS signal.

Another embodiment of the present invention has no GPS receiver built in the test scanner and, therefore, avoids the cost of the GPS receiver (most pn scanners have a GPS receiver).

Yet another embodiment of the present invention uses a delay-lock loop system to track pattern shift of the reference transmitter's pilot signals. The delay-lock loop allows the test scanner to accurately adjust its internal clock as the reference transmitter pilot signals underwent a phase shift. The delay-lock loop is formed by: a voltage controlled clock oscillator; a digital to analog converter; and a processor.

DETAILED DESCRIPTION OF THE INVENTION

According to the invention, the system for such testing consists of two units. One of the units ("scanner") is essentially a pn scanner with an internal timing circuit. It is used in the testing area for pn scanning where access to a global time reference such as the GPS is limited or not available The other unit is placed conveniently proximate the measurement area, in most cases close to a door or window, or wherever there is an unobstructed reception of GPS signals. This unit ("reference transmitter") contains a GPS clock that provides an accurate clock and timing, and a reference pilot transmitter. The latter is a low-power transmitter of an accurate, GPS-synchronized CDMA pilot or pilots with selectable pn offsets. The preferred embodiment is to use an offset close to zero, e.g., close to zero chips.

Figure 1:
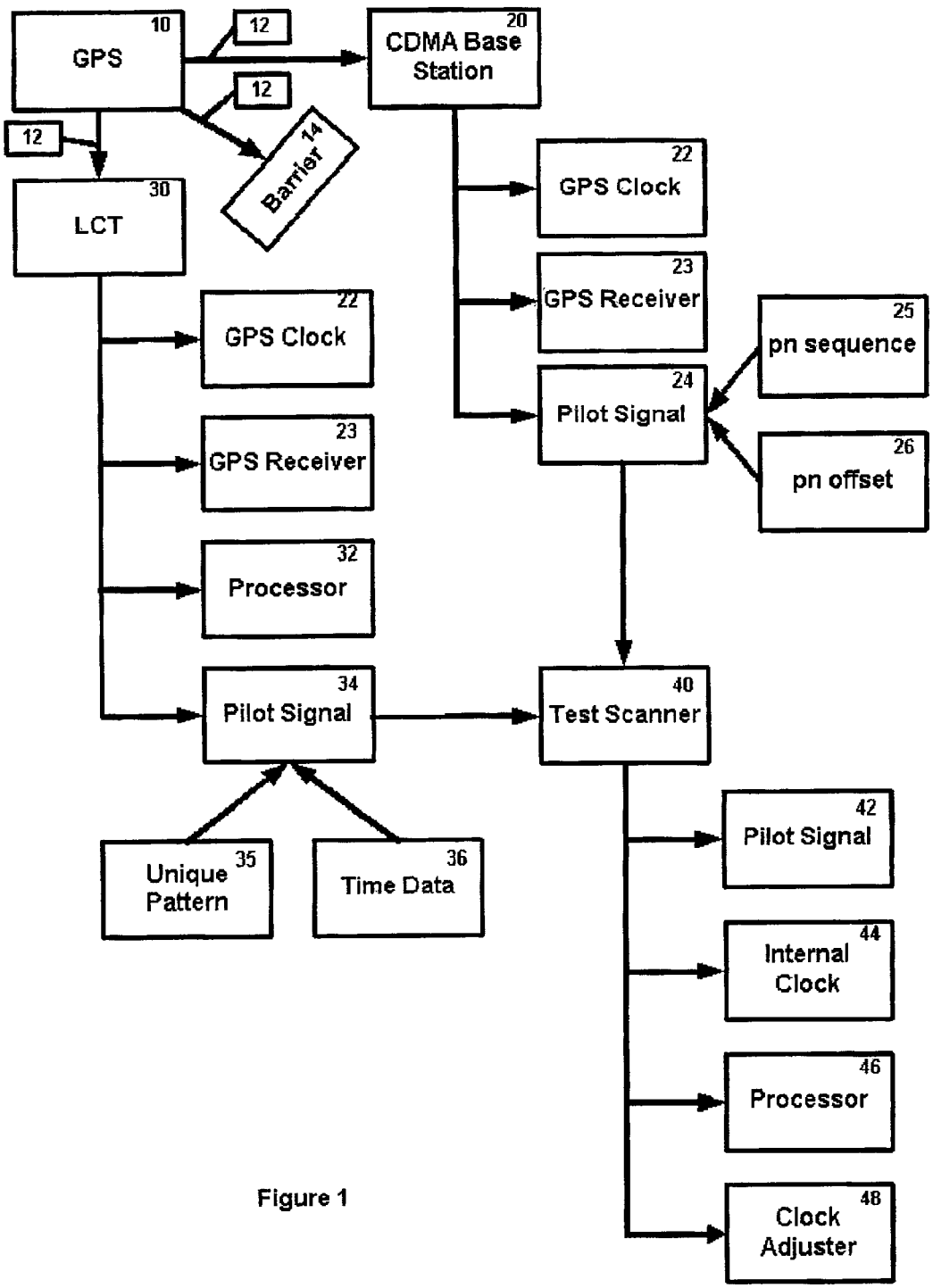
FIG. 1 illustrates the overall architecture according to one embodiment of the present invention

Referring to FIG. 1, the overall architecture according to one embodiment of the present invention is illustrated. The present invention generally comprises a local CDMA transmitter (LCT) 30, a test scanner 40, and at least one CDMA base station 20. The LCT 30 and CDMA Base Station 20 are in communication with a global positioning system 10. However, the test scanner 40 may be in a location where signals from the GPS 10 are obscured by some form of barrier 14.

The Global Positioning System 10 provides a universal clock to the system. Time information 12 is universally available to any device with a GPS receiver 23. However, the Test Scanner 40 is in a location where the GPS time broadcast 12 is obscured by a barrier 14. A local CDMA transmitter 30, also known as the reference transmitter, is positioned close to the Test Scanner 40, has non-obscured access to GPS 10. LCT 30 is equipped with a GPS receiver 23, an internal GPS clock 22 and a processor 32 that sets the clock. A pilot signal 34 with a unique pn sequence pattern 35 is transmitted in a CDMA pilot channel. Time data 36 is included in the pilot signal 34 transmissions.

Test scanner 40 performs pn scans for the pilot signals 42. If the processor 46 recognizes the pilot signal as coming from the LCT 30, the test scanner processor 46 sets the test scanner's internal clock 44. If the test scan detects a pilot signal that is not uniquely patterned, the test scanner processor 46 measures the CDMA Base Station 20 pilot signal 24 for propagation and adequacy of signal coverage. Usually, multiple CDMA base stations are measured.

A CDMA base station 20 has a GPS receiver 23 and GPS synchronized clock 22. The base station pilot signal 24 is characterized by having a random like pn sequence 25 which is easily distinguishable from the uniquely patterned 35, non-random pn sequence used by the LCT 30 (or reference transmitter). The pn offset 26 is time based, thus allowing a CDMA base station receiver, such as the test scanner 40, to correctly interpret the pn code. Use of an accurate, global time synchronization source is absolutely critical in this analysis.

A clock adjuster 48 is also available in one embodiment of the present invention. It is based on monitoring successive scans of the reference transmitter (LCT) for drift in the pn sequence pattern. Time adjustment is implemented with a delay-lock loop method as described below.

Figure 2:
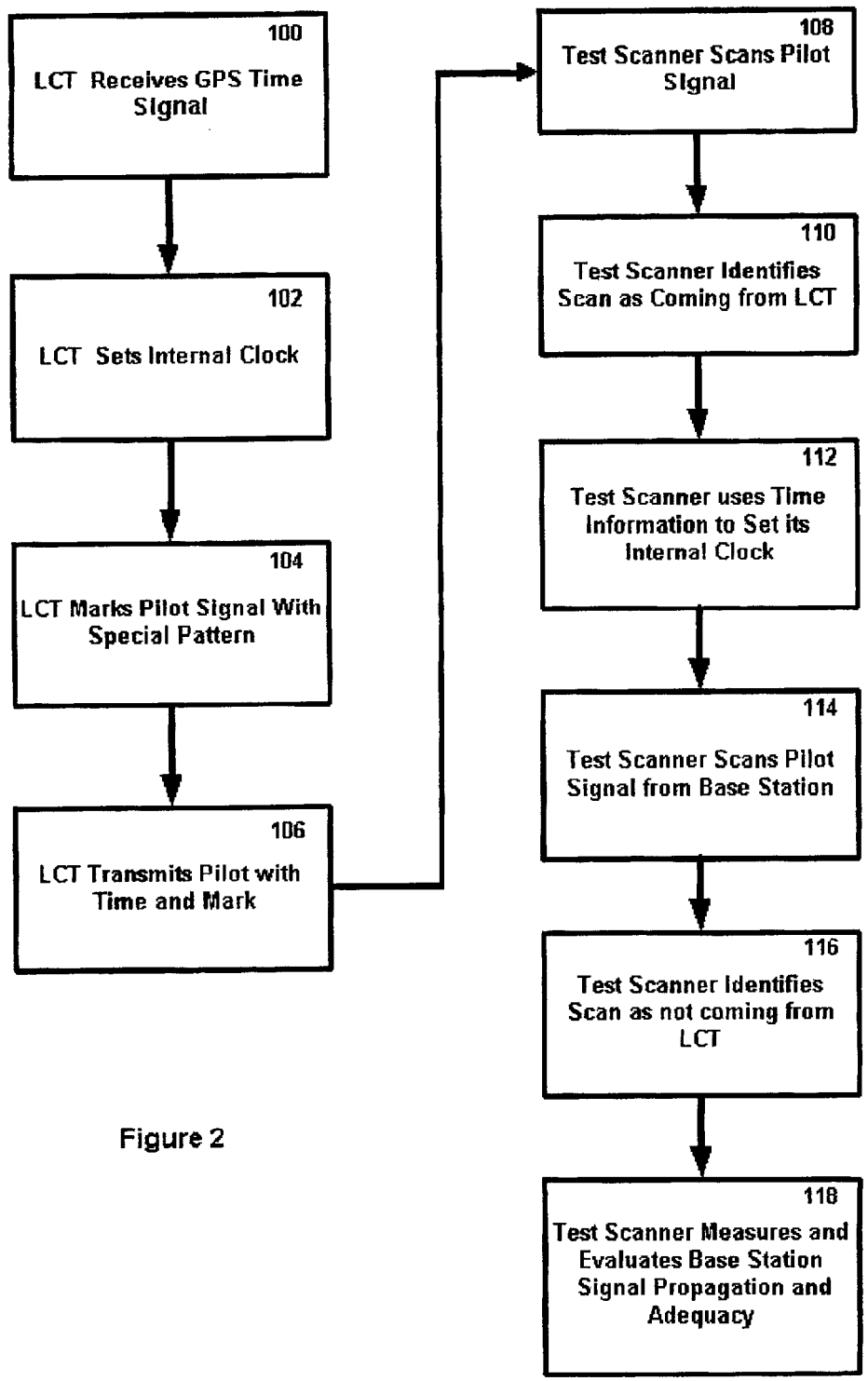
FIG. 2 illustrates the data flow of the present invention

Referring to FIG. 2, the data flow of the present invention is illustrated. The LCT (reference transmitter) 100 receives GPS time signals, which allows the LCT to set its internal clock 102. The LCT has a unique, non-random pn sequence in the pilot signal, thus the pilot is marked with a special pattern 104. The uniquely marked pilot is broadcast and time information is included 106.

The test scanner scans the pilot channel of CDMA transmissions 108. Because the LCT has a uniquely marked pilot signal, the test scanner readily identifies LCT scans 110. Using the time information from LCT, the test scanner sets its internal clock 112. The test scanner also scans pilot signals from at least one base station 114. The random nature of the pilot's pn sequence pattern allows the test scanner processor to conclude that the scan is not from the LCT 116. The test scanner measures and evaluates the signal from the base station for propagation and coverage adequacy 118.

In a preferred embodiment, the reference transmitter emits an easily recognized pattern ("marker") consisting of several closely positioned pilots. The test scanner recognizes the marker as emanating from the reference transmitter. Since the reference transmitter will have best performance if positioned at a distance of no more than one chip in corresponding pn offset units (about 240 meters), the propagation delay error will be negligible in most instances. Given the known position of the reference pilots, the whole scan measured and calculated by the scanner in the traditional way can be positioned correctly by the processing program in terms of offsets in reference to absolute time. The scan traces positioned by the described method will display the reference pilot group in the beginning (if it corresponds to zero offset), as well as other pilots corresponding to existing CDMA base stations. Scan traces for multipath and delayed components will also be positioned by the present invention. The test scanner uses the time information received from marker unit to set its internal clock so as to accurately calculate pilot time and pn offset.

In addition to positioning each measured scan, there is a processing program that measures the relative displacement of the reference pilot pattern from scan to scan. That is time drift is detected and compensation made. The program adjusts a timing generator, which is part of the scanner, in order to nullify the drift in the pattern position. Thus, the processing program is part of a delay-lock loop formed by a voltage-controlled clock oscillator, digital-to-analog converter, included in the test scanner.

Another benefit of the disclosed invention is that the scanning apparatus does not require a separate receiver channel for the reception of timing information, as would be the case if timing information were received from an outside location using a radio signal other than a CDMA pilot.

A method and apparatus For CDMA pn Scanning at Indoor and Other Obstructed Locations has now been illustrated. It will be appreciated by those skilled in the art that other variations of the present invention are possible without departing from the scope of the invention as disclosed.

I claim:

1. A method for CDMA signal testing at indoor and other locations where a global time synchronization signal is obstructed from a signal tester comprising:

receiving periodically the global time synchronization signal at a local CDMA transmitter to periodically set an internal clock of the local CDMA transmitter;

transmitting at least one signal from the local CDMA transmitter;

marking the at least one local CDMA transmitter signal with a unique pattern; including time information in the at least one local CDMA transmitter signal;

receiving the at least one local CDMA transmitter signal containing the time information and the unique pattern at a signal tester that is otherwise obstructed from receiving the global time synchronization signal;

receiving at the signal tester at least one signal from a CDMA base station;

distinguishing at the signal tester the at least one CDMA base station signal from the at least one local CDMA transmitter signal, wherein the signal containing the unique pattern is identified as the at least one local CDMA transmitter signal;

setting an internal clock within the signal tester based on the time information included in the at least one local CDMA transmitter signal;

measuring at the signal tester the at least one CDMA base station signal; and evaluating at the signal tester the at least one CDMA base station signal for signal propagation and coverage.

2. The method for CDMP signal testing at indoor and other locations where a global time synchronization signal is obstructed from a signal tester of claim 1, wherein there are a plurality of CDMA base stations and the method further comprising:

receiving at the signal tester at least one signal from the plurality of CDMA base stations;

measuring the at least one CDMA base station signal from each of the plurality of CDMA base stations; and evaluating the at least one CDMA base station signal for signal propagation and coverage form each of the plurality of CDMA base stations.

3. The method far CDMA signal testing at indoor and other locations where a global time synchronization signal is obstructed from a signal tester of claim 1, wherein the transmitting at least one signal from the local CDMA transmitter further comprises transmitting a pilot signal.

4. The method for CDMA signal testing at indoor and other locations where a global time synchronization signal is obstructed from a signal tester of claim 3 wherein the marking the at least one local CDMA transmitter signal with a unique pattern comprises transmitting simultaneously a plurality of closely positioned pilot signals.

5. The method for CDMA signal testing at indoor and other locations where a global time synchronization signal is obstructed from a signal tester of claim 3 wherein the global time synchronization signals are periodically received from a GPS transmitter and wherein the local CDMA transmitter internal clock is a GPS clock.

6. The method for CDMA signal testing at indoor and other locations where a global time synchronization signal is obstructed from a signal tester of claim 1 wherein the signal tester comprises a psuedonoise scanner.

7. The method for CDMA signal testing at indoor and other locations where a global time synchronization signal is obstructed from a signal tester of claim 6 wherein the psuedonoise scanner is a pilot channel scanner and wherein the local CDMA transmitter comprises a pilot transmitter with an internal clock and receiver for receiving periodically global reference time signals.

8. The method for CDMA signal testing at indoor and other locations where a global time synchronization signal is obstructed from a signal tester of claim 7 wherein the global time synchronization signals are received periodically from a GPS transmitter and wherein the internal clock is a GPS clock.

9. The method for CDMA signal testing at indoor and other locations where a global time synchronization signal is obstructed from a signal tester of claim 7 wherein the local CDMA transmitter signal is a pilot signal containing a pilot pattern and time information and further comprising:

measuring at the signal tester a relative displacement of the pilot pattern of the local CDMA transmitter signal from successive psuedonoise scanner scans of the local CDMA transmitter signal;

processing the measured displacement of the pilot pattern; and adjusting a timing generator of the psuedonoise scanner to compensate for drift in the measured pilot pattern.

10. The method for CDMA signal testing at indoor and other locations where a global time synchronization signal is obstructed from a signal tester of claim 9 wherein adjusting the timing generator of the signal tester comprises:

modifying a voltage controlled clock oscillator, a digital to analog converter and an imbedded processor.

11. A method for CDMA signal testing at indoor and other GPS obstructed locations comprising:

receiving periodically at a local CDMA pilot transmitter a global reference time signal from a GPS for setting an internal clock for creating time information;

transmitting periodically on a pilot channel a pilot signal from the local CDMP pilot transmitter;

marking the local CDMA pilot transmitter signal with a unique pattern;

including time information in the local CDMA pilot transmitter signal;

transmitting periodically the local CDMA pilot transmitter signal;

receiving periodically the local CDMA pilot transmitter signal containing time information and the unique pattern at a signal tester, wherein the signal tester comprises a psuedonoise scanner;

setting an internal clock of the signal tester by using the time information contained in the local CDMA pilot transmitter signal;

scanning at the signal tester a pilot signal from a CDMA base station;

distinguishing at the signal tester between the CDMA base station pilot signal and the local CDMA pilot transmitter signal, wherein the signal containing the unique pattern is identified as the local CDMA pilot transmitter signal;

setting an internal clock within the signal tester using the timing information contained in the local CDMA pilot transmitter signal;

compensating for a local CDMA pilot transmission signal pattern drift detected at the signal tester by adjusting a timing generator of the signal tester to modify the signal tester internal clock;

measuring at the signal tester the CDMA base station pilot signal; and evaluating at the signal tester the CDMA base station pilot signal for signal propagation and coverage.

12. An apparatus for CDMA signal testing at indoor and other locations where a global time synchronization signal is obstructed from a signal tester comprising:

a local CDMA reference transmitter comprising:
a reference internal clock for maintaining time information;
a receiver for periodically receiving a the global time synchronization signal;
a processor for setting the reference internal clock;
a unique signal pattern for marking a signal;
a transmitter for transmitting the signal, the signal comprising the unique pattern and time information and a CDMA testing device comprising:
a tester internal clock for maintaining time information;
a receiver for receiving the local CDMA reference transmitter signal and for receiving a signal from a CDMA base station;
a processor for setting the tester internal clock;
a processor for distinguishing between the CDMA reference transmitter signal and the CDMA base station signal; and
a processor for measuring and evaluating the CDMA base station signal for adequacy of signal propagation and coverage.

13. The apparatus for CDMA signal testing at indoor and other locations where a global time synchronization signal is obstructed from a signal tester of claim 12 wherein the local CDMA reference transmitter comprises a pilot channel transmitter for transmitting pilot signals.

14. The apparatus for CDMA signal testing at indoor and other location where a global time synchronization signal is obstructed from a signal tester of claim 13 wherein the unique signal pattern of the local CDMA reference transmitter comprises a plurality of closely positioned pilot signals transmitted simultaneously for creating a recognizable marker.

15. The apparatus for CDMA signal testing at indoor and other locations where a global time synchronization signal is obstructed from a signal tester of claim 12 wherein the receiver comprises a GPS receiver for periodically receiving a GPS synchronized time signal and wherein the reference internal clock comprises a GPS clock for maintaining the GPS synchronized time.

16. The apparatus for CDMA signal testing at indoor and other locations where a global time synchronization signal is obstructed from a signal tester of claim 13 wherein the testing device comprises a psuedonoise scanner for scanning for psuedonoise.

17. The apparatus for CDMA signal testing at indoor and other locations where a global time synchronization signal is obstructed from a signal tester of claim 16 wherein the local CDMA reference transmitter comprises a transmitter for transmitting a pilot channel signal and wherein the psuedonoise scanner comprises a scanner for scanning a pilot channel.

18. The apparatus for CDMA signal testing at indoor and other locations where a global time synchronization signal is obstructed from a signal tester of claim 15 wherein the universal reference time signal further comprises a GPS time signal for synchronizing time and wherein the reference internal clock comprises a GPS clock for maintaining GPS synchronized time.

19. The apparatus for CDMA signal testing at indoor and other locations where a global time synchronization signal is obstructed from a signal tester of claim 12 further comprising:

a means for detecting time drift comprising:
logic for measuring relative displacement of the local CDMA reference transmitter unique signal pattern from successive psuedonoise scanner scans of the local CDMA reference transmitter pilot channel signal; and
logic for processing the relative displacement of successive measurements of the local CDMA reference transmitter unique signal pattern and a means for adjusting the tester internal clock further comprising:
a timing generator for adjusting the signal tester internal clock; and a timing generator adjustor for adjusting the timing generator to compensate for drift in the local CDMA reference transmitter pilot pattern.

20. The apparatus for CDMA signal testing at indoor and other locations where a global time synchronization signal is obstructed from a signal tester of claim 19 wherein the timing generator adjustor comprises a delay lock loop for adjusting the timing generator to compensate for a detected timing drift.

21. The apparatus for CDMA signal testing at indoor and other locations where a global time synchronization signal is obstructed from a signal tester of claim 20 wherein the delay lock loop further comprising:
   logic for modifying a voltage controlled clock oscillator;
   logic for modifying a digital to analog converter; and
   logic for modifying an imbedded processor.

22. An apparatus for CDMA signal testing at indoor and other GPS obstructed locations comprising:
   a local CDMA reference transmitter comprising:
      a reference internal GPS clock for maintaining time information;
      a receiver for periodically receiving reference time signals from GPS;
      a processor for setting the reference internal GPS clock;
      a pilot channel transmitter for transmitting a pilot channel signal;
      a unique signal pattern for marking the local CDMA pilot channel signal; and
   a CDMA testing device comprising:
      a psuedonoise scanner for receiving pilot channel signals from the local CDMA reference transmitter and for receiving a pilot channel signal from a CDMA base station;
      a tester internal clock for maintaining time information; and
      a processor comprising;
         logic for distinguishing between a pilot channel signal from the local CDMA reference transmitter and the pilot channel signal from the CDMA base station
         logic for setting the tester internal clock,
         logic for adjusting a timing generator of the psuedonoise scanner so as to compensate for drift in the measured pilot pattern, and
         logic for measuring and evaluating the received signals for adequacy of signal propagation and coverage from the at least one CMA base station.

* * * * *